United States Patent [19]

Hattori et al.

[11] 4,216,021

[45] Aug. 5, 1980

[54] HIGH STRENGTH SILICON NITRIDE SINTERED MATERIAL

[75] Inventors: Yoshinori Hattori; Yasushi Matsuo, both of Nagoya, Japan

[73] Assignee: NGK Spark Plug Co., Ltd., Nagoya, Japan

[21] Appl. No.: 35,970

[22] Filed: May 4, 1979

[30] Foreign Application Priority Data

May 8, 1978 [JP] Japan ................................. 53-54835

[51] Int. Cl.$^2$ ............................................. C04B 35/58
[52] U.S. Cl. ................................. 106/73.2; 106/73.33; 106/73.5
[58] Field of Search .................... 106/73.2, 73.5, 73.4, 106/73.33

[56] References Cited

U.S. PATENT DOCUMENTS

| | | | |
|---|---|---|---|
| 4,025,351 | 5/1977 | Masaki | 106/73.5 |
| 4,043,381 | 8/1977 | Mazdiyasni et al. | 106/73.5 |
| 4,097,293 | 6/1978 | Koweya et al. | 106/73.2 |
| 4,102,698 | 7/1978 | Lange et al. | 106/73.2 |
| 4,117,095 | 9/1978 | Komeya et al. | 106/73.5 |
| 4,145,224 | 3/1979 | Mehalchick et al. | 106/73.5 |

FOREIGN PATENT DOCUMENTS 49-128915 of 1974 Japan ........................................ 106/73.5

*Primary Examiner*—O. R. Vertiz
*Assistant Examiner*—Mark Bell
*Attorney, Agent, or Firm*—Sughrue, Rothwell, Mion, Zinn and Macpeak

[57] ABSTRACT

A high strength silicon nitride sintered material having a modulus of rupture of about 100 kg/mm$^2$ or more, which is prepared by sintering a mixture of about 88.7 to 98% by weight of silicon nitride (Si$_3$N$_4$) and the balance a sintering aid comprising Al$_2$O$_3$, Y$_2$O$_3$ and Ti present in the following proportions based on weight:

$$\frac{Al_2O_3}{Y_2O_3} = \text{about 0.25 to 4.0}$$

$$\frac{Al_2O_3 + Y_2O_3}{Al_2O_3 + Y_2O_3 + Ti} = \text{about 0.44 to 0.97}$$

2 Claims, 1 Drawing Figure

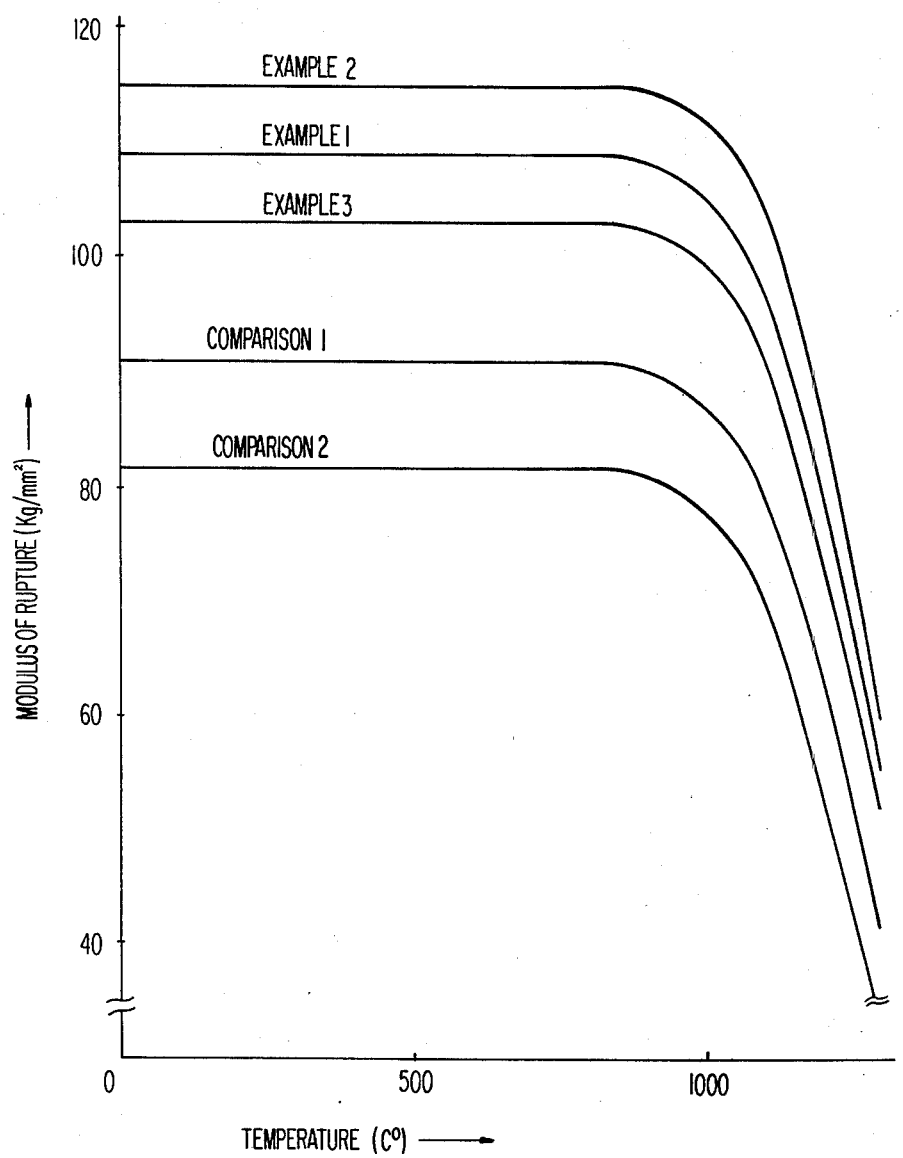

HIGH STRENGTH SILICON NITRIDE SINTERED MATERIAL

BACKGROUND OF THE INVENTION

1. Field of the Invention

The present invention relates to a sintered material containing as a main component silicon nitride ($Si_3N_4$) having high strength and more particularly to improving the strength of a silicon nitride sintered material by the addition of aluminium oxide ($Al_2O_3$) and yttrium oxide ($Y_2O_3$) thereto.

2. Description of the Prior Art

Sintered substances containing $Si_3N_4$ as a main component have been employed as parts in an automobile engine, a gas turbine, cutting tools, nuclear reactor structural materials and so on, since they possess excellent properties such as heat-resistance, high strength at high temperatures and a low coefficient of thermal expansion. With the intention of highly strengthening such substances and rendering them highly dense, additions of $Y_2O_3$-$Al_2O_3$, MgO and the compounds of $Al_2O_3$-MgO system have been used as a sintering aid. However, the strength of the sintered materials has not yet been raised to a satisfactory extent even by the addition of such sintering aids.

SUMMARY OF THE INVENTION

Therefore, an object of the present invention is to further increase the strength of the above-described silicon nitride sintered materials.

The above-described object is attained by adding $Al_2O_3$, $Y_2O_3$ and Ti as sintering aids in particular amounts to conventional silicon nitride sintered materials. At the conclusion of sintering, the Ti component is present in the form of TiN since Ti combines with $N_2$ contained in the sintering atmosphere.

More specifically, the object of the present invention is achieved with a novel, high strength silicon nitride sintered material having a modulus of rupture of about 100 kg/mm$^2$ or more, which is prepared by mixing or compounding about 88.7 to 98 wt% silicon nitride ($Si_3N_4$) and the balance $Al_2O_3$, $Y_2O_3$ and Ti in the following proportions (1) and (2) on the basis of weight:

$$\frac{Al_2O_3}{Y_2O_3} = \text{about 0.25 to 4.0} \quad (1)$$

$$\frac{Al_2O_3 + Y_2O_3}{Al_2O_3 + Y_2O_3 + Ti} = \text{about 0.44 to 0.97} \quad (2)$$

and then by sintering the resulting mixture.

BRIEF DESCRIPTION OF THE DRAWING

The FIGURE graphically illustrates the relationships between the modulus of rupture and temperature for the silicon nitride sintered materials prepared in the examples and the comparison examples.

DETAILED DESCRIPTION OF THE INVENTION

In the present invention, silicon nitride ($Si_3N_4$) must be present in an amount of about 88.7 to 98% by weight based on the total weight of inorganic starting material, preferably silicon nitride is present in an amount of about 94 to 97% by weight. When the proportion of $Si_3N_4$ in the inorganic starting materials is less than about 88.7% by weight, drastic deterioration of the sintered material occurs under high temperature conditions. On the other hand, when the proportion is above about 98% by weight sintering becomes difficult.

Silicon nitride ($Si_3N_4$) is found in two crystal forms, namely, the α-form and the β-form. As the starting material of the present invention, the $Si_3N_4$ powder preferably contains the α-form crystals in a much larger proportion because the α-form crystals exhibit higher sintering efficiency while the β-form crystals exhibit only lower sintering efficiency. The α-form crystal should be present in an amount of at least about 70% by weight based on the total amount of $Si_3N_4$ powder, preferably about 80% or more and particularly about 90% or more, from the standpoint of attaining high sintering efficiency.

In the present invention, three components consisting of $Al_2O_3$, $Y_2O_3$ and Ti are employed as a sintering aid. The amount of the sintering aid in the inorganic starting materials is 10 to 2% by weight, i.e., the balance, and among the three components composing the sintering aid the abovedescribed proportions (1) and (2) must be satisfied with regard to mixing amounts.

The value of $Al_2O_3/Y_2O_3$ in the proportion (1) is preferably about 0.5 to 2.0 and more preferably about 0.75 to 1.25. In the latter case, the sintering is effected to the greatest extent and consequently, the highest strength can be attained. In addition, when a value outside of 0.25 to 4.0 is employed the sintering efficiency deteriorates to an undesirable extent, though the reason for such deterioration has not yet been determined.

The value of $$\frac{Al_2O_3 + Y_2O_3}{Al_2O_3 + Y_2O_3 + Ti}$$

in proportion (2) is preferably about 0.6 to 0.9. When the value is less than 0.44, titanium nitride is deposited and the sintering efficiency is deteriorated. Consequently a drop in strength results. On the other hand, when the value of proportion (2) is larger than 0.97, the desired strength cannot be obtained.

Regarding $Al_2O_3$, both the α-type and the γ-type forms of $Al_2O_3$ may be employed in the present invention.

Not only yttrium oxide ($Y_2O_3$) having the composition of $Y_2O_3$ but also yttrium salts such as yttrium carbonates, yttrium nitrates, etc., which convert to $Y_2O_3$ upon sintering can be employed in the present invention.

The present invention is largely characterized by the addition of metallic titanium (Ti) or titanium hydride ($TiH_2$) as one component of the sintering aid. When $TiH_2$ is added, it is converted to Ti upon sintering. Therefore, the addition of $TiH_2$, which produces about the same result as the addition of Ti, can also be used.

The high strength silicon nitride sintered material is prepared from the above-described starting materials in the following manner.

Amounts of $Si_3N_4$ powder, $Al_2O_3$ powder, $Y_2O_3$ powder and Ti powder are selected depending upon the prescribed compositional ratios and mixed with one another. The powders usually employed have a purity of about 99% or better and a particle size of about 1μ or less. To the resulting mixture, a binder such as a paraffin (see U.S. Pat. No. 4,119,475) may optionally be added. The mixture is pressed or molded into the desired shape. The mold is sintered in a nonoxidizing atmosphere containing $N_2$ at a pressure of 1 atm. or higher. Sintering is conducted in an $N_2$ atmosphere or an atmosphere of $N_2$ and Ar gas, at a temperature of about 1,600° to 1,850° C., preferably 1,700° to 1,850° C., under the application of pressure.

Sintering is generally carried out by a uniaxial hot press process utilizing a graphite mold or by a hot-isostatic press process. Therein, the higher the pressure applied, the better the quality of the sintered material obtained. In general, a pressure of about 200 to 400 kg/cm² is applied in the case of the graphite mold process, and the pressure of about 100 to 3,000 kg/cm², preferably about 2,000 kg/cm² is applied in the case of the hot-isostatic press process.

At the conclusion of sintering a novel silicon nitride sintered material having an amorphous phase of an $Al_2O_3$-$Y_2O_3$-TiN system is produced. The composition of the thus-obtained novel sintered material is about 90 to 98 wt% $Si_3N_4$ having the β-type crystal structure (the α-form is converted to the β-form upon sintering), and the balance is an amorphous phase of the $Al_2O_3$-$Y_2O_3$-TiN system. The three components in the amorphous phase satisfy the above-described proportions (1) and (2), though Ti is present in a form of TiN by combining with $N_2$ contained in a nonoxidizing atmosphere containing $N_2$ used.

Novel silicon nitride sintered materials having high strength prepared according to the present invention are superior to conventional materials with regard to their strength at temperatures of 1,300° C. or lower.

Accordingly, the sintered materials prepared in the present invention are well-suited as materials for structural bodies in which dynamic stress such as impact, fatigue or the like is an important factor. It is thought that this increased strength is due to the reactivity of Ti being high enough to produce the following effect:

Individual $Si_3N_4$ grains are not only surrounded by the amorphous phase of the $Al_2O_3$-$Y_2O_3$-TiN system, but the $Si_3N_4$ grains are also believed to partially react with the amorphous phase which increases the strength of the grain-grain boundary. Another possible explanation for the improved strength may be that due to the presence of Ti a thin film of $SiO_2$ which forms around the $Si_3N_4$ grains through the sintering treatment and which affects adversely the strength of the sintered material obtained, is removed and converted into $Si_3N_4$ through the following reduction with Ti:

$$SiO_2 + Ti \rightarrow TiO_2 + Si$$

$$3Si + 2N_2 \rightarrow Si_3N_4$$

$$2C + 2TiO_2 + N_2 \rightarrow 2TiN + 2CO_2$$

The present invention will now be illustrated in greater detail by reference to the following examples. However, the present invention is not to be construed as being limited to these examples.

EXAMPLES 1–3 AND COMPARISON EXAMPLES 1 AND 2

To 94 wt% of $Si_3N_4$ powder having purity of 99% and an average diameter of 1 micron and comprising 90% of α-type crystal, $Al_2O_3$ powder having purity of 99.97% and an average diameter of 0.2 micron, $Y_2O_3$ powder having purity of 99.99% and an average diameter of 0.8 micron and $TiH_2$ powder having purity of 99% and an average diameter of 2 microns were mixed and compounded in the amounts set forth in the Table 1, wherein the amount of $TiH_2$ powder is converted to a Ti basis. Thus, five mixed powder samples were prepared.

Next, each of the samples was put into a graphite mold whose inner wall was previously coated with boron nitride, and sintered at a temperature of 1,800° C. and a pressure of 350 kg/cm² for 30 minutes. The density and the mechanical strength of each sintered material obtained were measured and further the identification of constituent materials was carried out using X-ray diffraction. The results obtained are shown in Table 1.

TABLE 1

| | Composition (wt %) | | | | Relative Density | F* | Izod** Impact Value | |
|---|---|---|---|---|---|---|---|---|
| | $Si_3N_4$ | $Al_2O_3$ | $Y_2O_3$ | TiN | (%) | (kg/mm²) | (Kg) | Constituent Materials |
| Comparison Example 1 | 94 | 3 | 3 | 0 | 99.3 | 91 | 20 | β-$Si_3N_4$ + Glassy Phase |
| Example 1 | 94 | 2.75 | 2.75 | 0.5 | 99.4 | 109 | 28 | " |
| Example 2 | 94 | 2.5 | 2.5 | 1 | 99.8 | 115 | 32 | " |
| Example 3 | 94 | 1.5 | 1.5 | 3 | 99.0 | 103 | 25 | " |
| Comparison Example 2 | 94 | 0.5 | 0.5 | 5 | 98.5 | 82 | 16 | β-$Si_3N_4$ + Glassy Phase + TiN |

*F is the modulus of rupture (kg/mm²) at a room temperature measured by 3-point bending, 20 mm bottom span, constant stress rate of 0.5 mm/min in accordance with JIS B-4104. All samples are 30 × 8 × 4 mm with machined surfaces.
**Measured using an Izod impact testing machine equipped with 0–40 kg · cm hammers (manufactured by Toyoseiki Seisakusho Co., Ltd.) using a notch-less sintered sample having a square base whose one side has a length of 6.35 mm, and a height of 30 mm in accordance with JIS K-7110. The sample piece is fixed on a supporting pedestal such that the sample is burried up to a height of 15 mm in thepedestal and the sample is struck by hammer at a point corresponding to the height of 25 mm.

Comparison Example 1 corresponds to a conventional sintered material and Comparison Example 2 corresponds to the sintered material containing an amorphous phase having a composition outside the limits of the present invention. It can be seen from Table 1 that the Examples 1 to 3 prepared in accordance with the present invention are much superior to the Comparison Examples 1 or 2 in regard to both modulus of rupture and Izod impact value. This is because in comparison with Comparison Example 1 having brittle $SiO_2$ layers on the individual surfaces of the β-$Si_3N_4$ grains and Comparison Example 2 containing additionally TiN, the $SiO_2$ layer present at the individual surfaces of β-$Si_3N_4$ grains is believed reduced by Ti to Si and to subsequently react with $N_2$ in the atmosphere to produce the silicon nitride as described hereinbefore.

Each of these samples were examined for the change in the modulus of rupture with an increase in temperature in a range of from room temperature to 1,300° C. The modulus of rupture obtained therein is plotted as ordinate and the temperature as the abscissa in the FIGURE. As can be seen from the FIGURE, the flexural strength of each of samples in Examples 1 to 3 is greater than those of both Comparison Examples 1 and 2 over the temperature range lower than 1,300° C.

While the invention has been described in detail and with reference to specific embodiments thereof, it will be apparent to one skilled in the art that various changes and modifications can be made therein without departing from the spirit and scope thereof.

What is claimed is:

1. A high strength silicon nitride sintered material having a modulus of rupture of about 100 kg/mm$^2$ or more, which consists essentially of about 88.7 to 98 wt% of Si$_3$N$_4$ and the balance consisting essentially of Al$_2$O$_3$, Y$_2$O$_3$ and TiN in amounts by weight which satisfy the following proportions:

$$\frac{Al_2O_3}{Y_2O_3} = \text{about 0.25 to 4.0}$$

$$\frac{Al_2O_3 + Y_2O_3}{Al_2O_3 + Y_2O_3 + TiN} = \text{about 0.44 to 0.97}$$

2. The sintered material of claim 1, wherein said AlO$_3$/Y$_2$O$_3$ ratio is about 0.75 to 1.25.

* * * * *